(12) United States Patent
Nygren

(10) Patent No.: US 6,715,012 B2
(45) Date of Patent: Mar. 30, 2004

(54) BUS SYSTEM

(75) Inventor: Aaron Nygren, München (DE)

(73) Assignee: Infineon Technologies AG, Munich (DE)

( * ) Notice: Subject to any disclaimer, the term of this patent is extended or adjusted under 35 U.S.C. 154(b) by 503 days.

(21) Appl. No.: 09/737,060

(22) Filed: Dec. 14, 2000

(65) Prior Publication Data

US 2001/0004748 A1 Jun. 21, 2001

(30) Foreign Application Priority Data

Dec. 14, 1999 (DE) .......................................... 199 60 243

(51) Int. Cl.⁷ ............................................. G06F 13/00
(52) U.S. Cl. ....................... 710/100; 710/305; 710/300; 710/316; 326/86
(58) Field of Search ................................. 710/266, 260, 710/108, 100, 305, 306, 300, 316; 326/86

(56) References Cited

U.S. PATENT DOCUMENTS

| | | | | |
|---|---|---|---|---|
| 5,649,126 A | * | 7/1997 | Lynch ........................ | 710/305 |
| 5,677,638 A | * | 10/1997 | Young et al. ................ | 326/39 |
| 5,887,144 A | * | 3/1999 | Guthrie et al. ............. | 710/300 |
| 6,035,355 A | * | 3/2000 | Kelley et al. ............... | 710/302 |
| 6,073,202 A | * | 6/2000 | Inagawa et al. ............ | 710/316 |
| 6,081,863 A | * | 6/2000 | Kelley et al. ............... | 710/312 |
| 6,182,178 B1 | * | 1/2001 | Kelley et al. ............... | 710/314 |
| 6,263,394 B1 | * | 7/2001 | Inagawa et al. ............ | 710/312 |
| 6,295,568 B1 | * | 9/2001 | Kelley et al. ............... | 710/305 |
| 6,314,484 B1 | * | 11/2001 | Zulian et al. ............... | 710/306 |
| 6,338,107 B1 | * | 1/2002 | Neal et al. .................. | 710/302 |
| 6,378,028 B2 | * | 4/2002 | Inagawa et al. ............ | 710/316 |
| 2001/0020258 A1 | * | 9/2001 | Inagawa et al. ............ | 710/126 |

FOREIGN PATENT DOCUMENTS

JP 09026841 A * 1/1997 ............. G06F/3/00

OTHER PUBLICATIONS

Koseko, et al., "Tri–state Bus Conflict Method for ATPG Using BDD," Nov. 1993, Int'l Conference on Computer Aided Design Proceedings of teh IEEE/ACM Internationl Conference on Computer Aided Design, pp. 512–515.*

Webopedia, "Driver," Feb. 8, 2002, p. 1, available <webopedia.com>.*

Stallings, William, Computer Organization & Architecture: Designing for Performance, 2003, Prentice Hall, 6th Edition, pp. 79–85.*

* cited by examiner

*Primary Examiner*—Mark H. Rinehart
*Assistant Examiner*—Donna K. Mason
(74) *Attorney, Agent, or Firm*—Laurence A. Greenberg; Werner H. Stemer; Ralph E. Locher

(57) ABSTRACT

The bus system has a bus and a plurality of line sections connected to the bus via respective drivers. The bus with line sections that are not needed can be interrupted at optional break points.

6 Claims, 1 Drawing Sheet

BUS SYSTEM

BACKGROUND OF THE INVENTION

Field of the Invention

The present invention relates to a bus system having a bus routed to an output and having a multiplicity of line sections connected to the bus at connection points via a respective driver (drive element).

In semiconductor memories, for example, line sections are routed from individual memory cell arrays to buses that are capable of transmitting a multiplicity of signals. Such buses may be tristate buses, for example, that is to say buses that are capable of assuming three states, namely "driven high", "driven low," and "not driven".

Upstream of the connection points to the bus, the individual line sections contain the drivers, which amplify the signals in the individual lines of the respective line sections and select the line section or the line which is currently able to connect to the bus.

FIG. 3 is a schematic illustration of a prior art bus system of the generic type. That bus system has a bus 1 which is routed to an output (DOUT) and to which a respective line section $3_0$ to $3_7$ is connected at connection points 2. Each line section $3_0$ to $3_7$ contains a driver 4 which can be driven via a respective control connection 5 in order to select from the line sections $3_0$ to $3_7$ that line section which is to be connected to the bus 1, and in order to amplify the signal carried in the selected line section.

The line sections $3_0$ to $3_7$ may each be one line or else may also be a plurality of lines, for example eight lines. If there are a plurality of lines in one line section $3_0$ to $3_7$, the driver 4 can additionally select one line from the selected line section and can connect this line to the bus 1.

The more drivers there are connected to such a tristate bus 1, the lower the operating speed of the tristate bus 1 becomes. This can be attributed to the fact that each further driver adds more source and drain paths and additional circuitry, which increases the capacity of the bus system. A higher capacity results in a loss of operating speed, however.

This loss of operating speed can be compensated for, within certain limits, by increasing the driver power. This is only possible up to a relatively small degree, however, since increased source and drain surfaces for the more powerful drivers likewise increase the capacity. Furthermore, it should be noted that, with an increasing number of drivers, the number of drive lines 5 for the enable signals (enable signals for the respective drivers 4) also increases, which likewise contributes to an increase in capacity.

This means that the bus system shown in FIG. 3 operates with excellent behavior while the number of drivers 4 is relatively small. However, the operating response of the bus system is increasingly impaired the more drivers with line sections $3_0$ to $3_7$ and drive lines 5 for enable signals are connected to the bus 1. This is because the operating response of each driver 4 is influenced by the capacities of the other drivers 4. In other words, each individual driver 4 can also "see" the other drivers 4.

With a small number of drivers 4, for example with four drivers 4, this influence from the other drivers is relatively small. However, if there are 24 drivers, for example, the influence of the other drivers on the currently selected driver cannot be disregarded, because the driver which is then currently selected is loaded with the capacities of all the other 23 drivers. In other words, the operating speed of the bus system is reduced considerably in such a case.

SUMMARY OF THE INVENTION

The object of the present invention is to provide a bus system which overcomes the above-noted deficiencies and disadvantages of the prior art devices and methods of this general kind, and which is capable, depending on requirements, of operating with minimum capacity loading so that the operating speed of the bus system is thus not impaired, or is impaired only slightly.

With the above and other objects in view there is provided, in accordance with the invention, a bus system, having:

a bus connected to an output;

a multiplicity of drivers connected to the bus at respective connection points;

a multiplicity of line sections each connected to the bus via a respective driver; and the bus being formed with an optional break point between at least two of the connection points.

In other words, the bus in the bus system according to the invention can, depending on requirements, readily be broken between two connection points, which means that all the drivers in the signal direction upstream of the break point no longer contribute to the capacity of the bus system. That is to say that, in the bus system according to the invention, all the drivers situated "before" the break point are disregarded, permitting a considerable reduction in capacity which, for its part, in turn considerably reduces the decrease in the operating speed of the bus system.

Accordingly, an opportunity is provided, if required, of breaking the bus between at least two connection points between the bus and the line sections. That is to say that the bus can readily be broken between two connection points between the bus and the line sections in the bus system according to the invention. Hence, the output signals from all the drivers situated on the bus before the break point in the signal direction are disregarded during evaluation of the signals produced at the output DOUT. An optional break point can be created, for example, by designing the bus 1 (cf. FIG. 3 first) between two connection points 2 such that it can easily be broken between these two connection points. This can be done, for example, by the action of an appropriate laser beam, by etching or by another form of removal. In other words, the break point arranged as an option in the bus system according to the invention makes it possible to ensure that drivers which are not required have no concurrent effect in the formation of the output signal DOUT (cf. FIG. 3), in order for long term operation of the bus system to be ensured in this manner.

In accordance with an added feature of the invention, the optional break point enables the bus to be broken if required.

In accordance with an additional feature of the invention, there are formed a plurality of break points at regular intervals along the bus.

In accordance with another feature of the invention, the bus is a tristate bus.

In accordance with a further feature of the invention, each line section comprises a plurality of lines.

In accordance with again an added feature of the invention, the bus is reduced to one line.

In accordance with again an additional feature of the invention, the bus is formed of a plurality of individual lines each having respective break points at different locations along the bus.

In accordance with again another feature of the invention, there are provided a plurality of buses each formed of a plurality of individual lines. Those buses then differ from one another with regard to the locations of the break points along the buses and the number of lines in the buses.

In accordance with a concomitant feature of the invention, there is provided a programmable unit defining the break points with "break" and "connect" states.

Other features which are considered as characteristic for the invention are set forth in the appended claims.

Although the invention is illustrated and described herein as embodied in a bus system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 3:
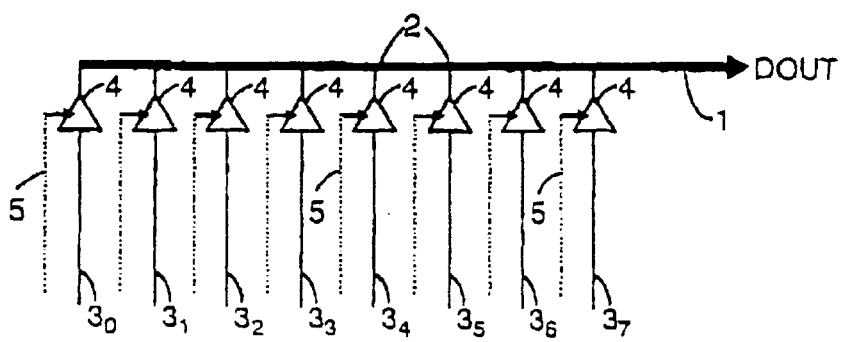
FIG. 3 is a similar view of a prior art bus system.

Reference is had to the introductory text above describing the prior art bus system shown in FIG. 3. In the figures, the same reference symbols are used for equivalent components in each case.

Figure 1:
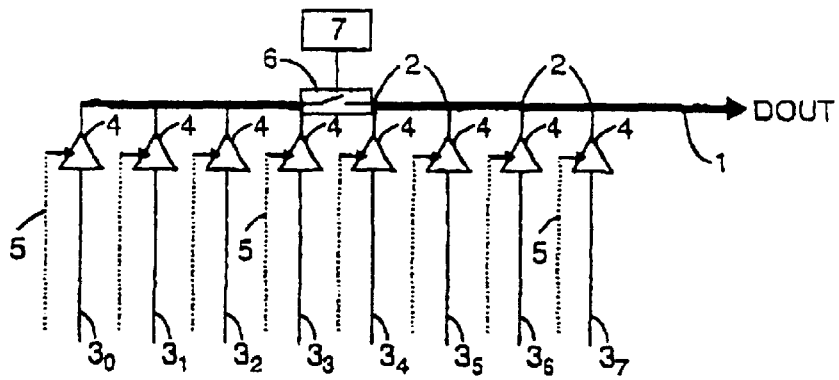
FIG. 1 is a schematic illustration of a first exemplary embodiment of the invention.

Referring now to the figures of the drawing showing the invention in detail and first, particularly, to FIG. 1 thereof, there is seen an illustrative embodiment in which, of the line sections $3_0$ to $3_7$, which in this case may each comprise eight lines, for example, the line sections $3_0$ to $3_3$ with their associated drivers 4 do not impair the bus 1 at its output DOUT in terms of capacity. This is so because the bus 1 is interrupted, i.e., broken, between the connection points 2 for the line sections $3_3$ and $3_4$. The break was chosen at this point because only the line sections $3_4$ to $3_7$ with their associated drivers 4 are required in the present case. In other words, the invention provides break points on the bus 1 at the places where disconnection of line sections which are not required can be expected.

These break points can be designed to be such that they represent "desired break points" for the bus 1, at which the bus can be interrupted electrically with particular ease. By way of example, the configuration of the bus 1 at particular locations at which there are break points may be such that the bus can easily be melted by the action of a laser beam for this purpose. Of course, other breaking options for the bus 1 are also conceivable, however, such as breaking it by means of the local action of an etchant.

It is particularly advantageous, however, if the break points are produced by programmable units 6 having the states "break" and "connect." These programmable units 6 are also able to be connected to a control unit 7 which drives the programmable units 6 so that they selectively enter the desired state.

Figure 2:
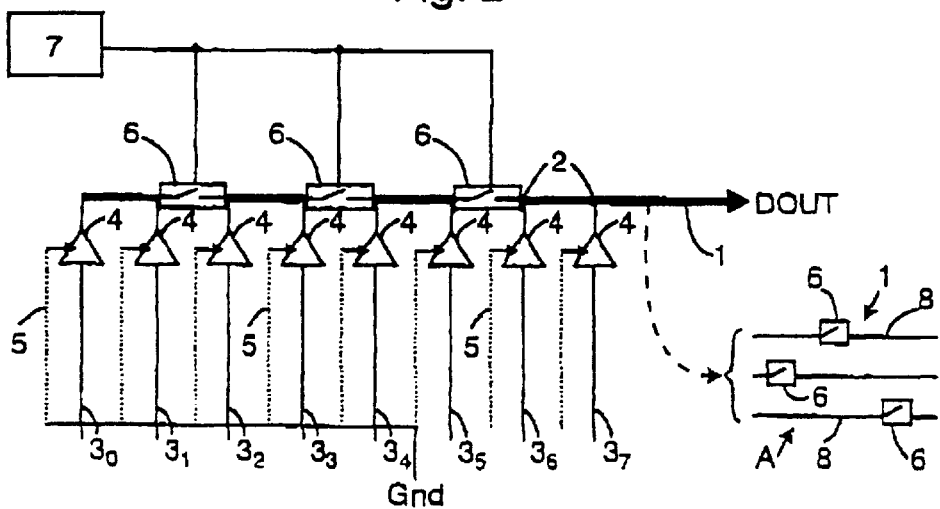
FIG. 2 is a schematic illustration of a further exemplary embodiment of the invention.

With reference to FIG. 2, there is shown a further exemplary embodiment of the invention, in which potential break points are provided between the connection points 2 for the line sections $3_1$ and $3_2$, for the line sections $3_3$ and $3_4$ and for the line sections $3_5$ and $3_6$. Subject to the bus being used in an eDRAM, for example, the bus can in this case be interrupted at the specified break points. It is thus possible to connect to the output DOUT of the bus 1 only the line sections $3_6$ and $3_7$ or only the line sections $3_4$ to $3_7$ or only the line sections $3_2$ to $3_7$ with their associated drivers 4 by interrupting the bus at the specified break points. Of course, it is also possible for all the line sections $3_0$ to $3_7$ to remain connected to the output DOUT, however, if the bus is not interrupted at the break points.

If the bus is interrupted between the connection points to the line sections $3_5$ and $3_6$ in the embodiment shown in FIG. 2, ground potential GND can be applied to each of the control lines 5 for the drivers 4 in the line sections $3_0$ to $3_5$, as shown in FIG. 2.

The buses 1 can be reduced to one line. Similarly, it is also possible for a plurality of buses 1 each to comprise individual lines 8 in which the programmable units 6 are arranged as break points in various positions, as illustrated in a detail A in FIG. 2.

The invention thus easily provides the option of connecting to a bus 1 only those line sections $3_0$ to $3_7$ which are actually needed. Burning away or disconnecting the other line sections ensures that there is a low-capacity bus system whose operating speed is impaired only as little as possible by the capacities of the remaining line sections and drivers 4.

I claim:

1. A bus system, comprising:
   a bus connected to an output;
   a multiplicity of drivers connected to said bus at respective connection points;
   a multiplicity of line sections each connected to said bus by a respective said driver;
   said bus being formed with an optional break point between at least two of said connection points, said optional break point being one of a plurality of break points formed at regular intervals along said bus; and
   said bus being one of a plurality of buses each formed of a plurality of individual lines, and said buses differ from one another with regard to locations of said break points along said buses and a number of said lines in said buses.

2. The bus system according to claim 1, wherein said optional break point enables said bus to be broken if required.

3. The bus system according to claim 1, wherein said bus is a tristate bus.

4. The bus system according to claim 1, wherein each said line section comprises a plurality of lines.

5. The bus system according to claim 1, wherein each of said buses is formed of a plurality of individual lines each having respective break points at different locations along said bus.

6. The bus system according to claim 1, which comprises a programmable unit defining said break points with states selected from the group consisting of "break" and "connect".

* * * * *